United States Patent [19]

Aggarwal et al.

[11] Patent Number: 5,078,768
[45] Date of Patent: Jan. 7, 1992

[54] HOT ISOSTATIC PRESSING OF FLUORIDE GLASS MATERIALS

[75] Inventors: Ishar D. Aggarwal, Fairfax Station, Va.; Barry B. Harbison, Clinton, Md.

[73] Assignee: The United States of America as represented by the Secretary of the Navy, Washington, D.C.

[21] Appl. No.: 632,197

[22] Filed: Dec. 21, 1990

[51] Int. Cl.[5] ............................................. C03B 37/10
[52] U.S. Cl. ..................................... 65/3.11; 65/102; 65/134; 65/DIG. 16; 65/136; 501/40; 501/904
[58] Field of Search ........... 65/2, 3.11, 4.21, DIG. 16, 65/102, 134, 136; 501/40, 904

[56] References Cited

U.S. PATENT DOCUMENTS

| | | | |
|---|---|---|---|
| 3,211,540 | 10/1965 | Cole | 65/4.21 |
| 3,224,851 | 12/1965 | Hicks | 65/4.21 |
| 3,355,273 | 11/1967 | Siegmund et al. | 65/4.21 |
| 4,428,524 | 1/1984 | Bhatti et al. | 65/1 X |
| 4,695,305 | 9/1987 | Classen | 65/DIG. 16 |
| 4,707,174 | 11/1987 | Johnson et al. | 65/DIG. 16 |
| 4,789,389 | 12/1988 | Schermerhorn et al. | 65/3.12 |
| 4,872,894 | 10/1989 | Hutta | 65/3.11 |
| 4,969,944 | 11/1990 | Marechal | 65/104 |

OTHER PUBLICATIONS

Halide Glasses for Infrared Fiberoptics, Almeida, 1987, Martinus Nijhoff Publishers, Boston, pp. 139-146, 187-196.

*Primary Examiner*—Robert L. Lindsay
*Attorney, Agent, or Firm*—Thomas E. McDonnel; Barry A. Edelberg

[57] ABSTRACT

Defect-free fluoride glass materials are made by hot isostatic pressing (HIP) of a fluoride glass. The process may be used to manufacture preforms or bulk fluoride glass. The external pressure applied during HIP squeezes bubbles from the glass and permits the use of a wider range of working temperatures than ordinarily available, thereby reducing crystallization defects.

18 Claims, 1 Drawing Sheet

HOT ISOSTATIC PRESSING OF FLUORIDE GLASS MATERIALS

BACKGROUND OF THE INVENTION

1. Field of the Invention

The present invention relates to the area of glass processing, and in particular, the production of glasses in which bubbles or porosities have been reduced or eliminated entirely.

Fluoride glasses have been employed in fabricating ultra low loss optical fibers and high energy laser windows. Optical fibers made from zirconium, barium, lanthanum, aluminum, and sodium (ZBLAN) fluorides have the potential for ultra low losses, with a theoretical lower limit of 0.01 dB/km. However, the process of melting and casting glass preforms from these materials results in the formation of bubbles in the core and at the core clad interface. Thus, fluoride glasses have yet to replace existing materials due to the problem of high extrinsic scattering in the glasses due to such bubbles. The elimination of such bubbles can provide the high quality optical materials required for ultra low loss optical fibers and high energy laser windows.

The use of fluoride glasses for ultra low loss optical fibers is limited by the transmission loss or attenuation in these fibers. Since the ultimate application of ultra low loss fibers is for long length, repeaterless communications systems, both low transmission loss and length of low loss fibers are of equal concern.

Numerous preform processing techniques have been attempted to provide ultra low loss fluoride glass fibers (Comyns (1989) *Critical Reports on Applied Chemistry* 27:187-92). All these techniques resulted in fibers with large extrinsic scattering losses, due primarily to bubbles in the center of the preform core and at the core-cladding interface. State of the art glass casting processes have reduced the severity of bubble formation by casting the glasses at lower temperatures to minimize contraction, yet micro-bubbles remain a problem.

The lowest loss achieved with fluoride glass optical fibers has been reported to be 0.7 dB/km for a fiber 30 meters long (Kanamore et al. (1986) *Jpn. J. Appl. Phys.* 25: L468-L470). Due to the short length of the fiber measured, some laboratories have questioned the accuracy of this measurement, and most researchers believe that the fiber should be at least 100 meters long to obtain accurate measurements. The lowest loss reported for a 100 meter length fluoride fiber is 2.6 dB/km (Williams et al. (1989) *Extended Abstracts of the 6th International Conference on Halide Glasses,* Clausthal, FRG, pages 521-25).

Fluoride glasses have been estimated to have an intrinsic loss of <0.01 dB/km. The use of such glasses would therefore theoretically increase the distance light signals could be transmitted by an order of magnitude relative to present silica optical fibers, which have intrinsic losses of 0.16 dB/km. The problems in achieving the intrinsic loss values for fluoride fibers are associated with absorption from transition metal ions and rare earth metal ion impurities, and the extrinsic scattering sources which result from glass processing and fiberizing. Presently, the impurity absorptions contribute very little to the measured losses in these fibers, while the scattering losses are the dominant cause of such high optical losses. Therefore, to reduce the scattering losses in these fibers, the method of glass processing requires modification so as to eliminate the sources of defects which give rise to extrinsic scattering.

The lowest losses achieved for fluoride glass optical fibers have all been achieved via a glass melting and casting process to fabricate preforms which are then drawn into fibers. The preform making processes all involve the casting of a core glass into a slightly lower refractive index cladding glass tube. When the core glass is cast, bubbles can be entrapped at the core/cladding glass interface. Then, as the core glass solidifies, a large thermal contraction occurs, creating bubbles in the center of the core. These resultant bubbles not only scatter light, but also provide nucleation sites for crystal formation when the preform is subsequently drawn into a fiber.

While attempts have been made to remove bubbles from fluoride glasses by isothermal heat treatments, this technique has not proved successful (McNamara et al. (1987) *Jour. Non-Cryst. Solids* 95 & 96:625-32). Some bubbles were eliminated by these heat treatments (presumably vacuum bubbles), but most collapsed to only a minimum diameter, while others broke up into many tiny micro-bubbles. In addition, the temperatures required to remove even the vacuum bubbles were excessive, causing the glass to crystallize and slump or distort geometrically.

As far as the present inventors are aware, no documented methods exist which will produce bubble-free fluoride glass preforms or bulk fluoride glass. Also, while HIP has been used previously to provide reduce defects in the production of conventional silica glass, conventional silica glasses, because of their greater viscosity and the large spread which exists between their glass transition temperatures and their melting points, are less prone to bubbles and crystallization than are fluoride glass fibers. Thus, the ability of a procedure to prevent or reduce defects in a silica glasses is not indicative of that procedure's ability to provide similar benefits in fluoride glasses.

SUMMARY OF THE INVENTION

Therefore, it is an object of the present invention to provide a method for producing glasses substantially free of bubbles or porosities, thereby reducing extrinsic scattering losses.

The foregoing object and others are accomplished in accordance with the present invention by hot isostatic pressing (HIP) of fluorophosphate glass and fluoride glass, including glass preform, or glass powder material of heavy metal fluoride glass.

As discovered by the present inventors and described herein, hot isostatic pressing (HIP) can eliminate bubbles from fluoride glass bulk materials and from fluoride glass preforms before the preforms are drawn into fibers, allowing the production of fibers with lower scattering and intrinsic losses near the theoretical limit of 0.01 dB/km.

BRIEF DESCRIPTION OF THE DRAWING

The above and other objects, features, and advantages of the present invention will be better understood from the following detailed descriptions taken in conjunction with the accompanying drawing, all of which are given by way of illustration only, and are not limitative of the present invention, in which FIG. 1 sets forth the operational elements, in schematic form, of the present HIP process.

DETAILED DESCRIPTION OF THE INVENTION

Figure 1:
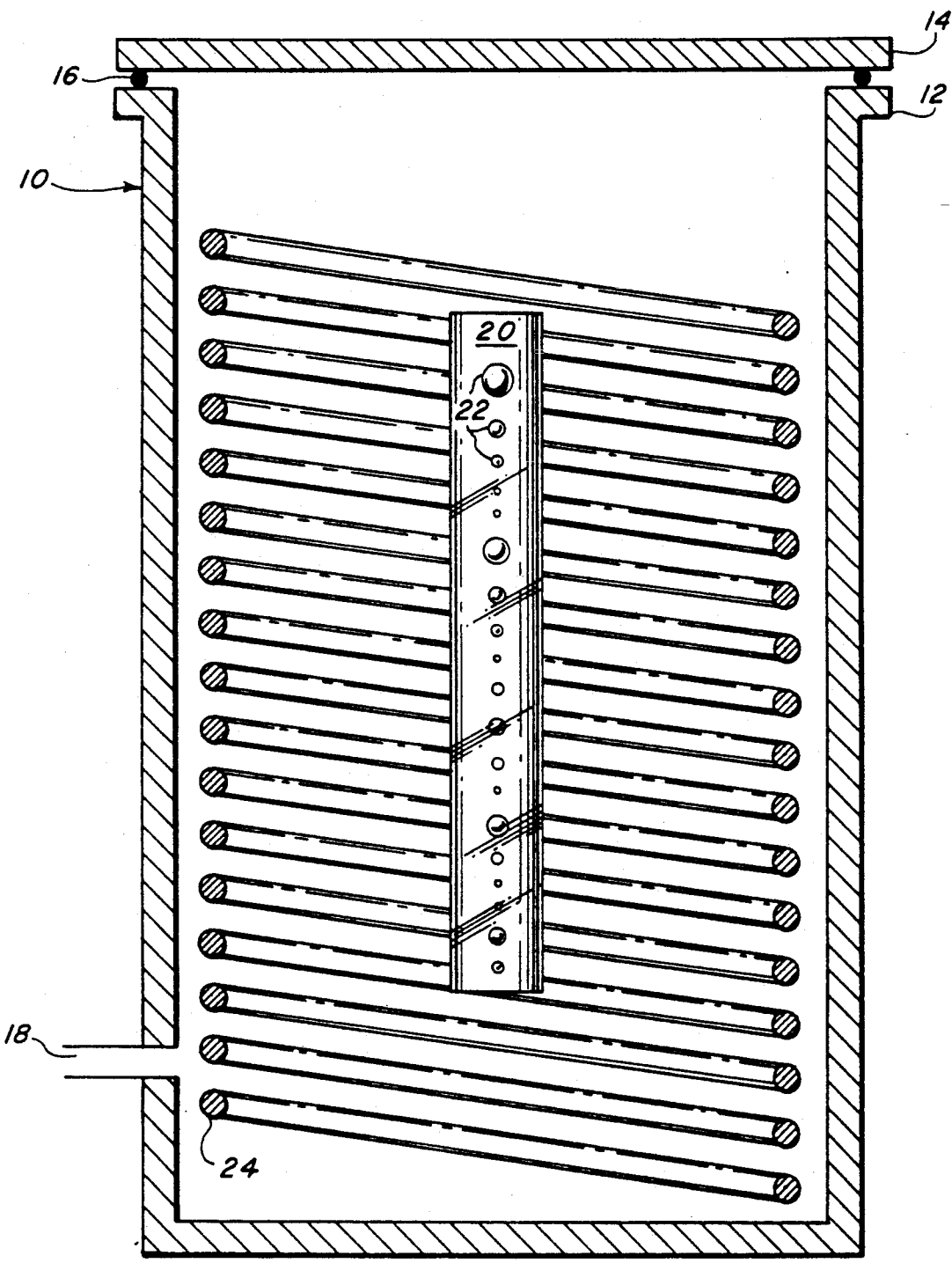

The following detailed description of the invention is provided to aid those skilled in the art in practicing the present invention. Even so, the following detailed description of the invention should not be construed to unduly limit the present invention, as modifications and variations in the embodiments herein discussed may be made by those of ordinary skill in the art without departing from the spirit or scope of the present inventive discovery.

FIG. 1 shows HIP pressure chamber 10 for use in the method of 12 the present invention. Chamber 10 is sealed between annular lip 12 and lid 14 by an 0-ring 16. Chamber 10 is evacuated through evacuation outlet/pressurization inlet 18. While chamber 10 is held in a dry box, lid 16 is opened and fluoride glass material 20, with bubbles 22 therein, is placed within chamber 10. The lid is then closed and the chamber resealed, reevacuated, and filled with a nonreactive gas, such as argon or nitrogen. Chamber 10 is then heated to the appropriate temperature by virtue of heating coils 21. Pressure is then applied through evacuation outlet/pressurization inlet 18 to squeeze bubbles 22 from fluoride glass material 20.

In the HIP of fluoride glass, the glass is heated to, or slightly below, the glass softening point. External pressure is then applied via a mechanical die and a smooth, nonadherent surface (e.g. Teflon ®, a polymer of tetrafluouroethylene) or gas pressure, on the material surface to enhance densification, producing a fully densified structure. Bubbles formed during glass processing are thereby removed at temperatures below which crystallization of the glass occurs, facilitating the production of geometrically undistorted glass structures in which transmission losses due to extrinsic scattering are reduced or eliminated.

HIP of fluoride glasses and preforms possesses the advantage over other processes that it can be performed at temperatures below the softening point of the glass, and thus provides a wider range of working temperatures (the temperature range over which the glass can be cast and/or molded without significant crystallization) than would otherwise be available. The working range for fluoride glass, $T_x$ (the crystallization temperature)$-T_g$ (the glass transistion temperature), is limited by a very steep viscosity 16 versus temperature dependency. Thus, to achieve densification without the aid of pressure, fluoride glasses must be heated to or above $T_s$ (the glass softening temperature), which for fluoride glasses is close to $T_x$. HIP assists the flow of glass at higher viscosities, permitting a significantly wider range of working temperatures, extending the range of working temperatures of the glass as much as 100% below the $T_s$ of the fluoride glass.

A novel feature of HIP of fluoride glass preforms over isothermal heat treating techniques is the use of external pressure to provide the dominant driving force for densification. Isothermal heat treating to eliminate bubbles in fluoride glasses requires relatively high temperatures, which results only in decreasing the size of bubbles, not completely eliminating them. The use of HIP to eliminate bubbles in fluoride glass preforms employs high pressures to assist in the flow of glass. Since the pressure assists the glass flow, lower temperatures can be used during densification, minimizing glass crystallization which occurs at temperatures >290° C.

In addition to minimizing cyrstallization, the lower temperatures maintain the cylindrical geometry of the preform by avoiding slumping induced by gravitational forces.

HIP can be employed in the fabrication of thick, large diameter fluoride glass windows for use in bulk infrared optics. The limited cooling rate of the glass, coupled with the marginal stability of fluoride glasses, restricts the size of crystal free windows which can be fabricated by melting and casting techniques. HIP can also be employed in the fabrication of larger fluoride 17 glass windows by densifying glass powders at temperatures below which crystallization occurs. In addition, very pure glass powders 19 made by chemical vapor deposition can be hot isostatically pressed to obtain low impurity absorption, in addition to eliminating crystals and bubbles. Additional products of commercial value which can be produced via the process of the present invention include optical components such as fiber optics, lenses, mirrors, mirror blanks, prisms, and gratings.

The process of the present invention can be applied to fluoride glasses of different compositions which can vary in their physical properties. For example, while ZBLAN (which can contain, in core glass formulations, in addition to the fluorides of the metals listed above, Yt, In, Pb, Li, Ga, and Th fluoride, and combinations thereof, and in clad glass formulation, in addition to the fluorides of the metals listed for clad glass above, Zr, Yt, In, Pb Li, Ga and Th fluoride, and combinations thereof) has been exemplified, supra, it is intended that the present invention be applicable to all fluoride glasses.

The best manner of employing this process is to heat the particular glass just below its softening point, at the low end of the working temperature of that glass, prior to applying pressure. The amount by which the range of working temperature of the glass is extended by HIP varies predictably based upon the fluoride glass in question and the amount of pressure applied. The range of working temperatures for most fluoride glasses, as extended by the process of the present invention, is from about 200° to about 600° C. For fluorophosphate glasses this range is from about 300° to about 900° C.

The amount of pressure applied should be sufficient to significantly extend the range of working temperature of the glass. The range of useful pressures in the process of the present invention varies from about 5 psi to about 50,000 psi.

The glass should be placed under pressure until all bubble defects are essentially removed. Typically, the time of application at any pressure is broad, ranging from about five minutes to many days up to about one month, depending on the size of the glass structure to be fabricated, larger structures requiring longer time periods at pressure.

Finally, the fluoride glass should be heated and cooled at rates typically used in the heating and cooling of fluoride glasses, in order to prevent localized overheating if the heating rate is too quick, or thermal stress fracture if the cooling rate is too quick. Typical heating and cooling rates in the method of the present invention range from about 0.1° to about 10° C. per minute. In the case of very large glass pieces, or structures with sharply varying dimensions, heating rates of <1° C./min should be applied to avoid fracturing by thermal stresses. Similarly, on cooling, slow ramp down rates will avoid fracture.

The rate at which the glass is pressurized or depressurized is usually determined by the HIP apparatus employed. While the HIP apparatus employed in the following examples was limited to a pressurizing rate of 300 psi/min, other HIP units that apply pressure via a mechanical die can have pressurizing rates exceeding 10,000 psi/min. In order to avoid longer times at the HIP temperature, higher rates of pressurizing are preferred. This preference is due to the observation that the glass must first be heated at least above $T_g$ before applying high pressures to avoid fracturing the glass at the bubbles. The rate of depressurizing, however, is not critical, and is a function of the HIP apparatus.

If the surface finish of the glass structure is critical, the material can be inserted in an inert protective sheath such as Teflon ®, and rather than applying pressure via a mechanical die, pressure can be applied via the use of an inert gas in a pressurized chamber. The use of either a die having a smooth, nonadherent surface or gas pressure is important to the production of fluoride glass articles with smooth outer surfaces. Unlike silica fibers, fluoride fibers cannot be fire polished without deleterious crystallization and reaction with $H_2O$ generated by the flame.

Due to the hygroscopic nature of fluoride glasses, a very dry atmosphere (typically <1 ppm water) should surround the sample whenever it is heated. Alternatively, if such a dry environment cannot be insured, the sample can be encapsulated under vacuum with a material such as Teflon ®, which will deform under pressure at the HIP temperature.

Having described the invention, the following examples are given to illustrate specific applications of the invention including the best mode now known to perform the invention. These specific examples are not intended to limit the scope of the invention described in this application.

EXAMPLES

Methods and Materials:

Glass Samples. The glass samples used to obtain the representative results described hereinbelow were fluoride glass preforms 10 mm in diameter and 12 cm in length. These preforms were made with a core glass 5-6 mm in diameter, inside a cladding glass tube 2-2.5 mm thick. The core glass was made from fluorides of Zr, Ba, La, Al, and Na (ZBLAN), with molar percentages of 53:20:4:3:20, respectively. The cladding glass was made with a slightly lower refractive index by partially substituting Hf fluoride for Zr fluoride (HZBLAN), with molar percentages of 26.5:26.5:20:4:3:20, respectively. Before the HIP process, the samples were examined for bubble size and density under an optical microscope at 200 X.

HIP Apparatus. The HIP apparatus into which the samples were placed consisted of a resistance heated oven in a cylindrical chamber 10 cm in diameter by 10 cm deep. Once the samples were loaded into the chamber, a lid was bolted down on an o-ring flange to seal the chamber. The HIP chamber was first evacuated to <1 millitorr to remove any moisture, then refilled with dry argon before the sample was heated to 280° C. Once the sample temperature had been reached, the argon pressure was gradually increased to 10 ksi. The samples were then held under these conditions for periods of 10 to 60 minutes, and cooled at 5° C./min to room temperature. After being removed from the HIP chamber, the samples were again inspected under an optical microscope to detect any remaining bubbles.

Experimental Results

The experimental approach employed to prove the utility of the HIP technique in eliminating bubbles in fluoride glasses involved first identifying the temperatures at the maximum pressure (10 ksi) which would promote densification. Initially, a temperature of 290° C. was attempted; however, this was determined to be too high, as the glass samples were distorted by slumping. Next, a temperature of 275° C. resulted in the fracturing of the glass structure at the bubbles. In the first two sets of experiments, the samples were heated slowly at 10° C./min while the HIP chamber was pressurized. Thus, to avoid fracture, the sample in the next experiment was first heated to 280° C., and the pressure was then increased from 0 to 10 ksi at the rate of 0.5 ksi/min. The sample was held under these conditions for 30 minutes, and then cooled to room temperature at the rate of 5° C./min. This experiment was totally successful in eliminating bubbles in the fluoride glass samples without fracturing, thus demonstrating the importance of first heating the glass to near its softening point before applying pressure.

Following the previous procedure, the effect of time at pressure was further investigated. The results indicated that the elimination of bubbles occurs at pressures less than 10 ksi, for even the shortest times under this pressure resulted in elimination of the bubbles. The presence of bubbles was determined by examining the glass samples both before and after the HIP process under an optical microscope at a magnification of 200 X. At this magnification, bubbles as small as two microns could be resolved. The present process has been successful in eliminating bubbles ranging from three millimeters to five microns.

Finally, while the operation of the fluoride glass HIP process has been exemplified for preforms for ultra low loss optical fibers, other fluoride glass structures for infrared optics are also amenable to this process.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for producing an essentially defect free fluoride glass, comprising the steps of:
   (a) heating a fluoride glass to a temperature below the softening point of said fluoride glass;
   (b) applying a degree of external pressure on the surface of said glass effective to cause significant flow of said glass at said temperature for a time sufficient to produce a fully densified, geometrically undistorted fluoride glass substantially free of bubbles; and
   (c) cooling said glass to room temperature.

2. The process of claim 1, wherein said fluoride glass is a heavy metal fluoride glass.

3. The process of claim 2, wherein said heating in step (a) is carried out in the range from about 200° to about 600° C.

4. The process of claim wherein said heating step (a) is carried out at the rate of from about 0.1° to about 10° C. per minute.

5. The process of claim 1, wherein said heating is carried out at the rate of <1° C./min.

6. The process of claim 1, wherein said pressure application step (b) is carried out in the range from about 5 psi to about 50,000 psi.

7. The process of claim 1, wherein said pressure is applied in step (b) for a period of time ranging between from about five minutes to about one month.

8. The process of claim 1, wherein said external pressure in step (b) is applied via a mechanical die or gas pressure.

9. The process of claim 8, wherein said material is inserted in an inert protective sheath, and said pressure is applied via a mechanical die.

10. The process of claim 8, wherein said pressure is applied via the use of gas pressure.

11. The process of claim 1, wherein said cooling step (c) is carried out at the rate of from about 0.1° to about 10° C. per minute.

12. The process of claim 2, wherein said fluoride glass comprises Zr, Ba, La, Al, Na, Yt, In, Pb, Li, Ga, and Th fluoride, or a combination thereof.

13. The process of claim 12, wherein said fluoride glass is present within a fluoride glass cladding tube.

14. The process of claim 13, wherein said cladding glass tube comprises Hf, Zr, Ba, La, Al, Na, Yt In, Pb, Li, Ga, and Th fluoride or a combination thereof.

15. The process of claim 11, wherein said pressure is increased at the rate of 0.5 ksi/min., and said sample is held at 280° C. at 10 ksi for a period of 30 min.

16. The process of claim 12, wherein the atmosphere surrounding said material consists of <1 ppm water during said heating, or alternatively, said material is encapsulated under vacuum with a material which will deform under said pressure at said temperature.

17. A process for producing an essentially defect free fluorophosphate glass, comprising the steps of:
(a) heating a fluorophosphate glass to a temperature below the softening point of said fluorophosphate glass;
(b) applying a degree of external pressure on the surface of said glass effective to cause significant flow of said glass at said temperature for a time sufficient to produce a fully densified, geometrically undistorted fluorophosphate glass substantially free of bubbles; and
(c) cooling said glass to room temperature.

18. The process of claim 17, wherein said heating in step (a) is carried out in the range from about 300° to about 900° C.

* * * * *